INVENTOR.
Alan R. Cook

INVENTOR.
Alan R. Cook
BY
ATTORNEY.

INVENTOR.
Alan R. Cook

ATTORNEY.

United States Patent Office 3,064,831
Patented Nov. 20, 1962

3,064,831
UNLOADER FOR STORAGE CONTAINERS
Alan R. Cook, Kansas City, Mo., assignor to Butler Manufacturing Company, Kansas City, Mo., a corporation of Missouri
Filed Dec. 27, 1960, Ser. No. 78,519
8 Claims. (Cl. 214—17)

This invention relates generally to the removal of bulk materials from storage containers such as tanks, bins, silos and the like, and refers more particularly to apparatus for obtaining complete clean-out of the storage container.

In the storage in flat bottom tanks or other containers of various materials it has been known to provide a central discharge outlet in the bottom of the container and to remove the materials laterally beneath the floor from the vicinity of said outlet to the exterior of the container by a suitable conveyor such as a screw conveyor. While usually such an arrangement is satisfactory during the initial phase of withdrawal, by itself it is not capable of providing complete clean-out of the material. This is due principally to the fact that the sole force acting to cause the material in the container to descend into the outlet is gravity. Eventually the material surrounding the central path of discharge reaches its angle of repose, and unless supplemental agitation is supplied, flow of the material from the container will cease.

As is known, the angle of repose and "flowability" of various materials varies according to the physical properties of the particular material, including such factors as configuration of the particles, moisture (or liquid) content, and mass. Some materials, particularly grains such as "wet corn" or the like, have a high degree of cohesion in bulk form. Consequently the volume of material in the latter case which will flow by gravity into the discharge outlet is rather limited. The usual occurrence is for the central portion of the mass disposed above the discharge outlet to descend into and be withdrawn from the outlet, leaving a large self-supporting, ring-like mass still within the container.

It is one of the principal objects of the present invention to provide novel sweep auger means for obtaining discharge from the storage container of the residual mass which will not flow by gravity alone. The invention has a number of advantages over previously known devices intended for this purpose. These advantages, briefly described, include the following: (1) The apparatus according to my invention is self-contained within the storage tank or bin and can be set in operation at any time during unloading; (2) it is capable of being so positioned as to require an extremely low starting torque; (3) it produces more rapid and efficient movement of material than the conventional sweep augers in use today; (4) through a unique arrangement of torque and thrust forces, the device is operable to produce efficient transfer of the material toward the outlet while advancing uniformly in a sweeping action, thus to achieve optimum utilization of driving power.

Still another object of the invention is to provide a novel sweep auger structure in which the sweep auger is mounted to a fixed support within the container, yet is capable of free swinging movement in vertical planes while maintaining a continuous drive to the auger.

A further object of the invention is to provide a sweep auger of the character described which has all the advantages hereinbefore set out and which is powered from the exterior of the container.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views, FIG. 1 is a fragmentary plan view of the inside bottom of a typical storage tank fitted with the invention, the tank wall being shown in section;

Figure 1:
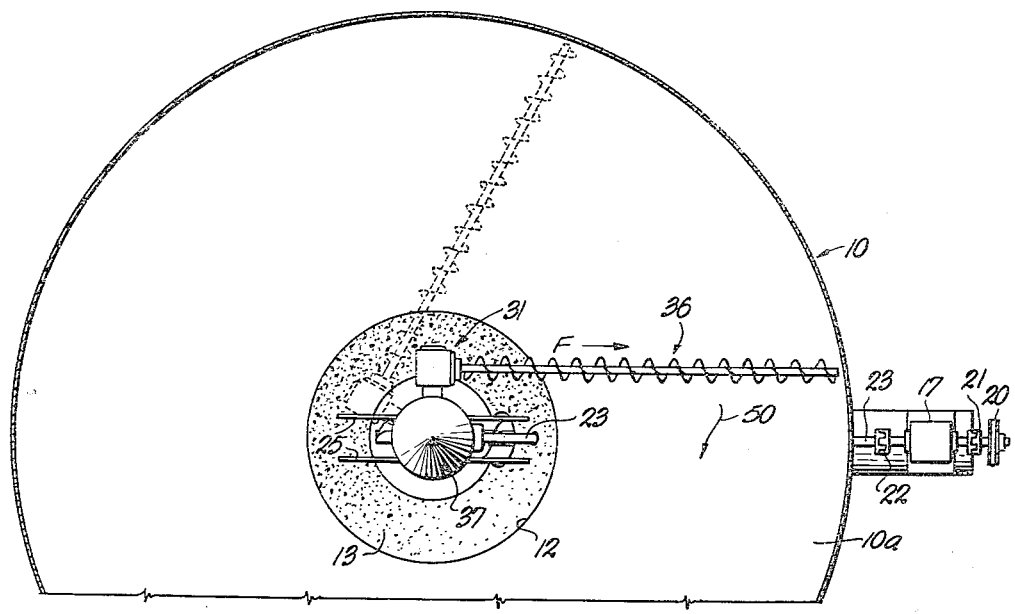
Figure 2:
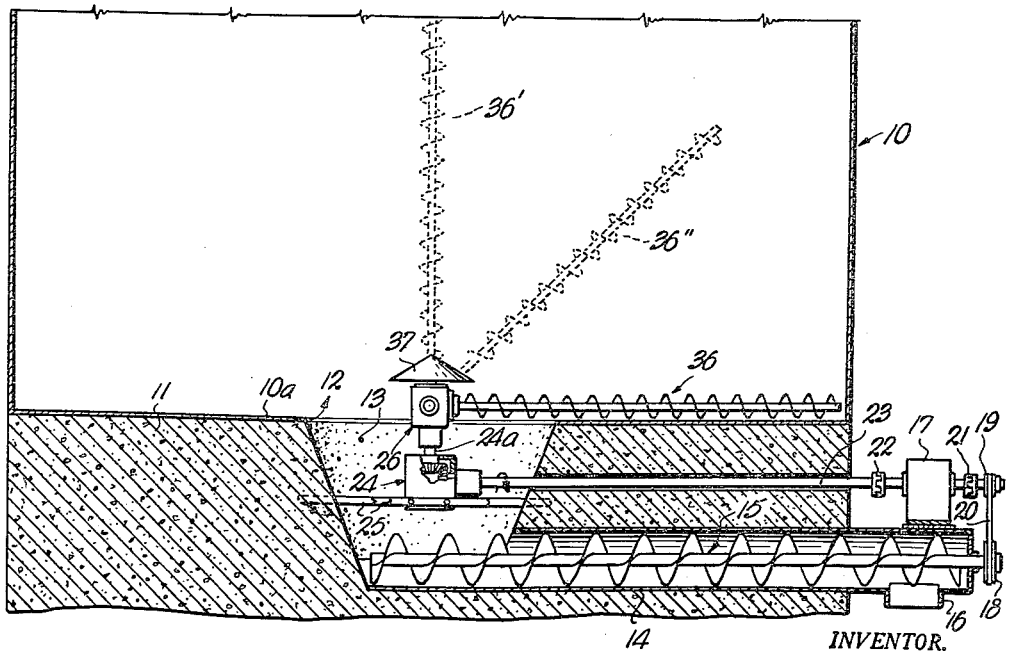
FIG. 2 is a side elevational view of the sweep auger mounted in place in a typical storage tank, the tank wall, foundation and lateral discharge auger tube being shown in section.

Referring to the drawings and initially to the embodiment illustrated in FIGS. 1 through 4, in FIGS. 1 and 2 reference numeral 10 indicates the circular side wall of a typical bulk storage tank or bin adapted to be filled with particulate or pulverulent materials, for example, grains and the like. While not shown, it will be understood that such a tank has a top opening for filling purposes, and that the material will, when delivered to the tank, fill same to the desired level. The tank is mounted on a foundation 11 which may be of concrete. Provided centrally in the bottom 10a of the tank is a circular discharge outlet 12 which forms the upper end of a hopper-like cavity 13 in the foundation.

Disposed in the bottom of cavity 13 and extending outwardly through the foundation in an auger tube 14 is a discharge auger or screw conveyor 15. A discharge spout 16 is located on the exposed end of tube 14. The shaft of the auger is drivingly connected at its outer end with a drive motor 17 through the medium of sprockets 18 and 19, chain 20 and clutch 21. The motor is supported on a platform suitably secured to the top of the tube 14. It will be understood that motor 17 may either be internal combustion or electrically driven, and that suitable controls will be provided.

The motor 17 is also drivingly connected through a clutch 22 to a drive shaft 23. Shaft 23 extends rotatably through a passageway formed in the foundation and connects with the right angle gear box 24 supported centrally in cavity 13. Preferably the support structure for gear box 24 comprises a pair of parallel braces 25 having their ends embedded in the foundation and bolted or otherwise firmly secured at their central portions to the gear box.

Figure 3:
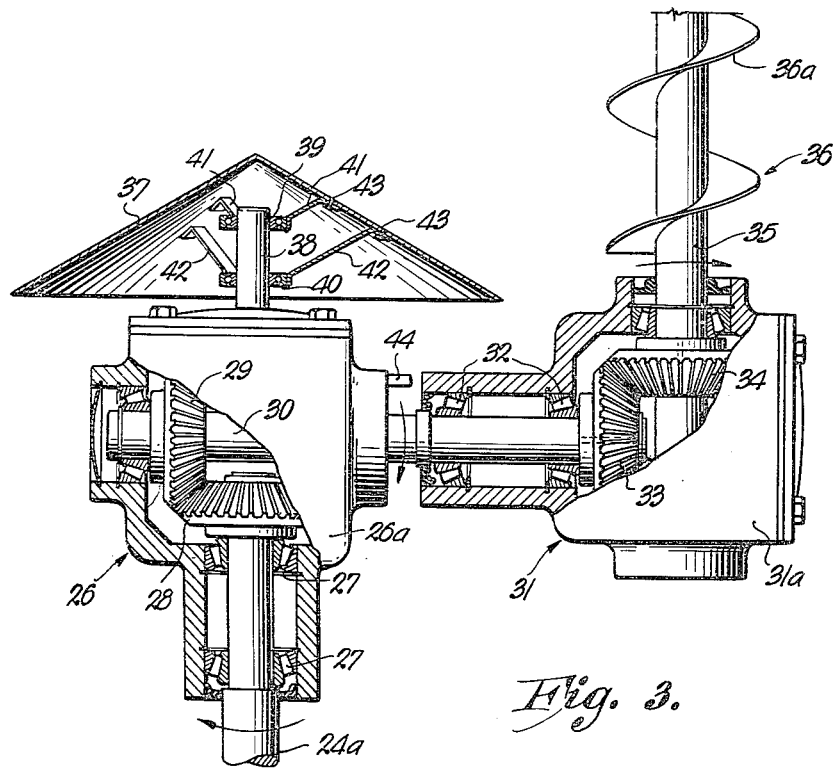
FIG. 3 is an enlarged side elevation of the sweep auger gear boxes and cover, portions being broken away for purposes of illustration and the sweep auger being in a vertical position to better reveal the structure.
Figure 4:
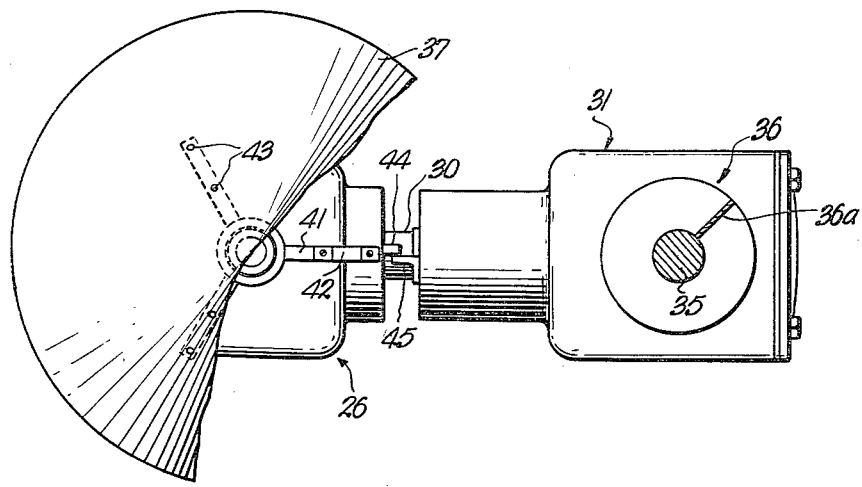
FIG. 4 is an enlarged top plan view of the sweep auger, gear boxes and cover as shown in FIG. 3, parts again being broken away for purposes of illustration.

The output shaft 24a of gear box 24 projects vertically upward and forms the input shaft of a second gear box 26. The housing 26a of gear box 26 is rotatably supported on shaft 24a through the medium of combined radial and thrust bearings 27 (FIG. 3). A bevel gear 28 is secured to the upper end of shaft 24a. Gear 28 meshes with a second bevel gear 29 within the housing. Gear 29 is keyed to a horizontal shaft 30 journaled within the housing in suitable combined radial and thrust bearings and projecting horizontally therefrom.

Shaft 30 in turn forms the input shaft of still a third right angle gear box 31 similar in construction to gear box 26. The housing 31a of gear box 31 is supported for rotation relative shaft 30, being connected therewith through combined radial and thrust bearings 32. Shaft 30 terminates within housing 31a in a bevel gear 33 which meshes with a similar gear 34 keyed to an output shaft 35. The shaft 35 is, of course, rotatably journaled within housing 31a in suitable combined radial and thrust bearings and extends from the housing to form the shaft of the sweep auger 36 having a spiral blade 36a.

As will be evident from FIGS. 1 and 2, the length of auger 36 is preferably such that the outer end lies fairly close to the wall of the tank when the auger 36 is horizontal and resting on the bottom of the tank.

Supported on top of the upper central gear box 26 is a shield or cover 37 in the form of a cone shaped hood. Cover 37 is supported on the gear box in such fashion as to permit the gear box 26 to turn thereunder while the cover is stationary. The support structure includes the upstanding post 38 secured at its lower end to the top of gear box 26. The inner races of vertically spaced bearings 39 and 40 are secured to post 38, while the outer races of those bearings have secured thereto the inner ends of outwardly radiating upper and lower braces 41 and 42 respectively. The outer ends of braces 41 and 42 are bent parallel with the cover and secured thereto by rivets or spot welds 43. The diameter of cover 37 is sufficient to protect the gear box 26 from packing of material around it due to vertical weight of the material directly above the gear box. Preferably it is made as large in diameter as can be accomplished without interfering with the vertical swinging of the auger 36.

The orientation and pitch of the flights or blades on the discharge auger and sweep auger 36 is such that while the discharge auger is moving material outwardly from cavity 13, the sweep auger engages and draws material in the bin inwardly toward the cavity. The sweep auger is capable of being swung to a vertical position about the axis of shaft 30 as at 36' of FIG. 2, or can assume any angular position with respect to the bottom of the bin, for example, the intermediate position 36" of FIG. 2. In other words, the sweep auger is rotatable in a vertical plane about the axis of shaft 30. Cooperating stops 44 and 45 are provided respectively on housings 26 and 31 to limit the swing of the auger 36 in the vertical plane to approximately 90° from the horizontal. It likewise will be evident that the transmission system to the sweep auger maintains continuous drive to the sweep auger through the full range of movement of the sweep auger, both around the center of the bin and about the axis defined by shaft 30.

To illustrate one of the principal advantages of the present invention, as illustrated in FIGS. 1 through 4, which is derived mainly from the offset of the longitudinal axis of the sweep auger 36 from the vertical axis about which it sweeps (the axis of shaft 24a), let us assume that the sweep auger is resting on the bottom of the bin (as shown in FIGS. 1 and 2) and is advancing in the direction shown by arrow 50 of FIG. 1 into a mass of material which partially covers the bottom of the bin. As the flights bite into the material they tend to move that portion in engagement therewith toward the hopper along the axis of the sweep auger. However, if the material is dense and packed, or excessively cohesive, the traction of the auger with the floor may be insufficient to cause the auger to bite deeply enough into the mass to accomplish the desired result. In the present case, the traction of the auger on the floor (or any underlying material) is supplemented by the reactive force exerted on the auger by the resistance of the material to flow axially along the conveyor toward the discharge hopper. This reactive force is indicated by arrow F in FIG. 1. Since the auger 36 is offset from the vertical axis about which the auger swings, force F produces a moment tending to assist in causing advance of the auger and forcing the auger to bite more deeply into the mass. This assisting moment is maintained so long as any material is being engaged and moved by auger 36.

It will also be apparent that the reaction between gears 33 and 34 in the third gear box 31 provide a force tending to depress the sweep auger toward the bottom of the bin. In other words, the greater the resistance of the material to movement lengthwise of the auger by the auger flights, the greater is the depressing torque. This torque combined with the torque described above, tending to advance the sweep auger about the center of the bin produces a highly efficient auger action.

The freedom of the auger to swing in a vertical plane about the horizontal axis defined by shaft 30 provides advantages in addition to those noted above.

Efforts have been made in the past two provide a conventional sweep auger supported for movement around the center of the bin in a horizontal plane adjacent the floor as an integral part of the storage structure. In this case the auger lies adjacent the floor and when the bin is filled is subjected to the full weight of the material thereabove. Because of packing and the weight of the material itself, to start such an auger requires an exceedingly high starting torque with the concurrent danger of damage to the transmission system or auger itself.

The present invention permits the sweep auger to be initially disposed in a substantially vertical position while the bin is being filled. This is the position corresponding to that shown at 36' in FIG. 1. Any suitable means for holding the auger in this position during filling may be employed, such as a rope or wire line releasably attached to the distal end of the sweep auger. Once sufficient material has been added as to surround and support the auger in its upright position, the supporting line can be removed and filling completed.

When it is desired to withdraw material from the bin, the discharge auger 15 is set in motion by starting motor 17 and engaging clutch 21. As material is removed from the vicinity of the cavity 13 by the discharge auger, additional material will ordinarily descend from above. If no bridging occurs, withdrawal through the use of the discharge auger alone can be continued until the material in the bin reaches the angle of repose. At this time the sweep auger 36 will have assumed a position similar to that at 36" of FIG. 2, resting on the exposed surface of the material. Clutch 22 is then engaged to transmit power to the sweep auger. The sweep auger will then proceed to draw material therealong toward the cavity and at the same time advance slowly around the bin under the combination of forces earlier described. The natural weight of the auger, plus the torque forces produced by traction and the offset of the auger axis from the center of sweep insure that the auger is maintained in feeding engagement with the material and concurrently promote a sweeping action resulting in progressive lowering of the level of material remaining in the bin until the bin is completely empty.

It for any reason there is no initial flow of material When the discharge auger 15 is started, the sweep auger 36 can be started to pull material downwardly and to break away any bridges forming above the cavity. Whether started then or after the material has reached the angle of repose as described earlier in either case the load on the auger is considerably less than in the case when it is positioned adjacent the bottom of the bin with material piled on and above it.

Figure 5:
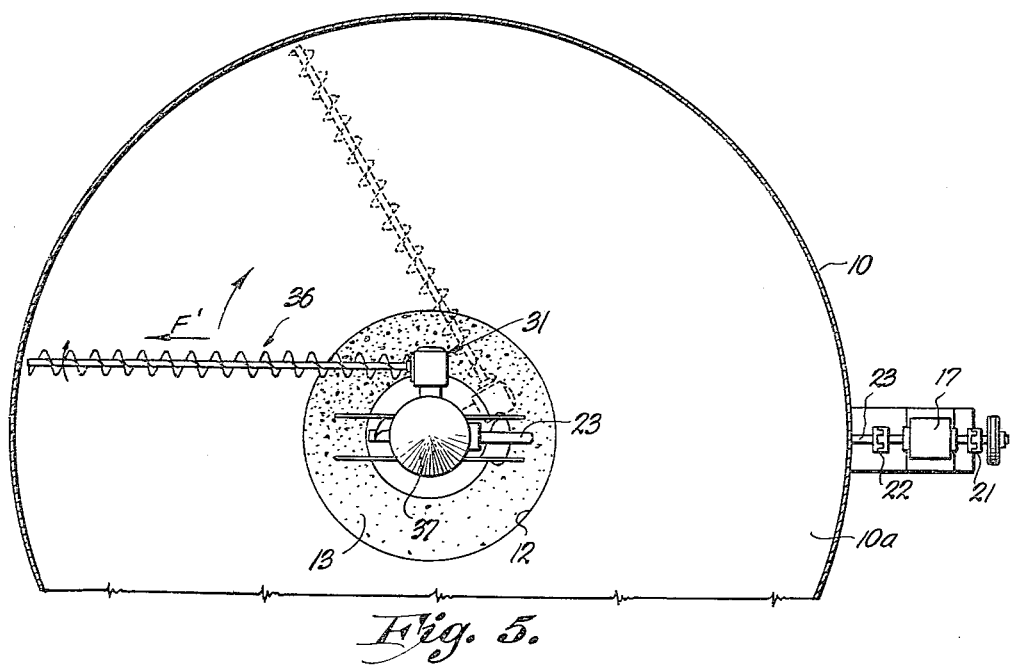
FIG. 5 is a view similar to FIG. 1, but showing a modified arrangement having advantages under certain conditions of operation.

Under some circumstances and with certain materials it may be desirable to arrange the sweep auger 36 so that the axial force exerted on the auger counter to the flow of material retards rather than assists swinging movement. This is easily accomplished by changing the direction of offset from the sweep center to the side opposite from that illustrated in FIG. 1, or as illustrated in FIG. 5. In this case, the force F' tends to act against the tractive engagement of the auger with the floor or underlying material, thus assisting in causing the auger to bite downwardly into the material rather than rolling freely over it. It will be understood that in this instance, the stops will be provided also so as to limit swinging movement of the auger to approximately the vertical position.

It is likewise desirable that under some circumstances of operation a torque be applied to the auger tending to lift it as the resistance to movement of material by the auger increases. This can be accomplished through the arrangement of the gears illustrated in FIG. 6. Shaft 24a and its terminal gear 28 rotate in the same direction as in FIG. 4. However, in this example, gear 29' is located on the right hand side of housing 26, causing shaft 30' to be rotated in the direction opposite from that of shaft 30 in the arrangement shown in FIG. 3. The gear 34' on the auger shaft 35' is likewise changed in position so as to obtain the correct direction of rotation of the auger for feeding of material toward the center.

Figure 6:
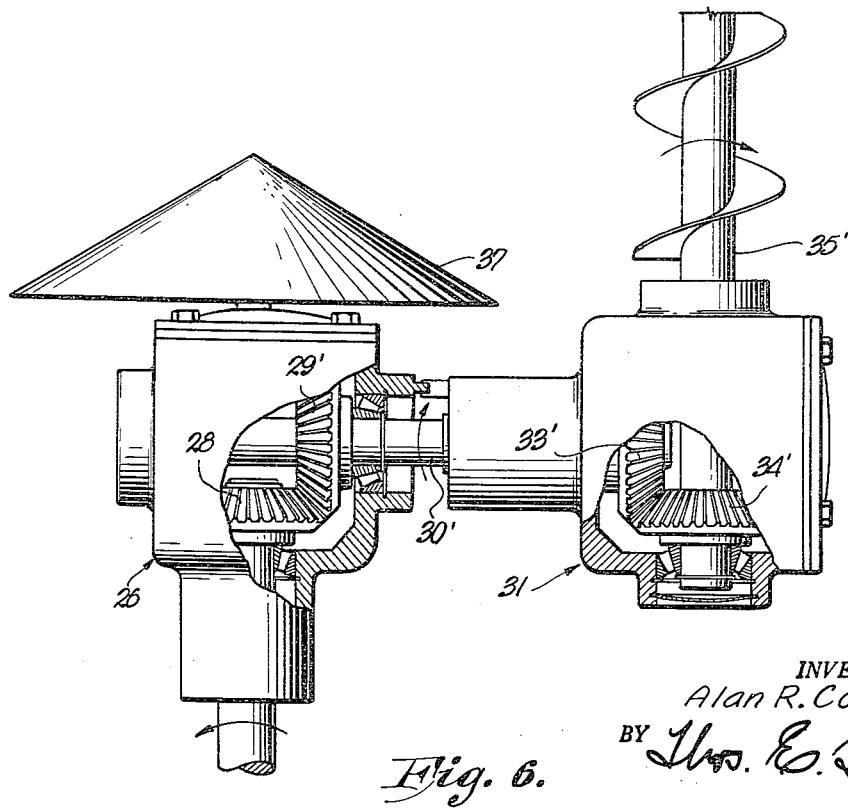
FIG. 6 is a view similar to FIG. 3, but showing an arrangement wherein a lifting torque is applied to the auger during rotation of the latter.

One of the great advantages of the arrangement shown in FIG. 6 is that it provides apparatus in which the auger can be raised to the vertical position during filling by simply rotating the auger during filling. In other words, as the auger turns in the material, the resistance to rotation of the auger will be accompanied by a torque applied by gear 33' tending to pivot the auger upwardly. Thus, as the bin or tank is filled, the auger tends to rise toward the vertical (or low torque) starting position, and when filled, the auger is in the proper starting position.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an unloader for storage structures having a floor and a central discharge outlet in said floor, the combination of a central pivot in said discharge outlet, an auger having one end adjacent and mounted for rotation about said pivot whereby the auger is capable of swinging movement around said pivot and the interior of the storage structure, the longitudinal axis of the auger being offset laterally from and to one side of said pivot, and power means for turning the auger on its own axis whereby to impel any material engaged thereby toward said discharge outlet.

2. An unloader according to claim 1 wherein the direction of offset of said auger axis from said pivot is such that the resistance to movement of material by the auger produces a turning moment about the pivot which supplements the normal traction of the auger.

3. An unloader according to claim 1 wherein the direction of offset of the auger axis from said pivot is such that the resistance to movement of the material produces a turning moment about the pivot which opposes the normal traction of the auger.

4. In an unloader for storage structures having a floor and a central discharge outlet in said floor, the combination of a vertically disposed rotatable power shaft supported centrally in said outlet, an auger inside said storage structure having its axis spaced laterally from and to one side of said power shaft, transmission means connecting said auger with said power shaft to cause said auger to turn about its own axis responsive to rotation of said power shaft, and support means for said auger permitting swinging of the auger around said power shaft while power is being supplied to the auger from the power shaft.

5. In an unloader for storage structures having a floor and a central discharge outlet in said floor, the combination of a vertical shaft disposed centrally in said outlet, a second shaft extending horizontally with respect to said first shaft, means supporting said second shaft for rotation in a horizontal plane about said first shaft, an auger extending laterally with respect to said second shaft and disposed inside said structure with one end adjacent said second shaft but offset horizontally from said first shaft, means supporting said auger for pivotal movement in a vertical plane and about the axis of said second shaft, and power means operable to turn said auger about its own axis.

6. In an unloader for storage structures having a floor and a central discharge outlet in said floor, the combination of a vertical shaft disposed centrally in said outlet, support means for said shaft arranged to permit rotation of same about the shaft axis, a housing supported by and rotatable relative to said vertical shaft about the axis of the latter, a horizontal shaft journaled in said housing and extending away from the vertical shaft, a second housing swiveled to the extending portion of said horizontal shaft for pivotal movement about the axis of the horizontal shaft, an auger having one end journaled in said second housing and extending therefrom at a right angle with said horizontal shaft away from said discharge outlet, transmission means in said housings operable to drivingly connect said vertical shaft with the auger while permitting pivoting of the housings with respect to the respective shafts, and power means drivingly connected with said vertical shaft.

7. The combination as in claim 6 wherein said transmission means includes components operable to impose a torque on said second housing tending to rotate it relative to said horizontal shaft in response to resistance imposed on the rotation of the auger about its own axis.

8. An unloader as in claim 6 including a cover disposed above and overlying said first housing, and means supporting said cover from said first housing, said means including a connection permitting relative rotation between said cover and said first housing.

References Cited in the file of this patent

UNITED STATES PATENTS

| | | |
|---|---|---|
| 2,393,572 | Soma | Jan. 22, 1946 |
| 2,711,814 | McCarthy | June 28, 1955 |
| 2,934,224 | Puckett | Apr. 26, 1960 |

FOREIGN PATENTS

| | | |
|---|---|---|
| 1,088,874 | Germany | Sept. 8, 1960 |